(12) United States Patent  (10) Patent No.: US 7,926,394 B1
Gallagher  (45) Date of Patent: Apr. 19, 2011

(54) OFFSET FORCE CLAMP

(76) Inventor: William M. Gallagher, Toms River, NJ (US)

( * ) Notice: Subject to any disclaimer, the term of this patent is extended or adjusted under 35 U.S.C. 154(b) by 9 days.

(21) Appl. No.: 12/454,117

(22) Filed: May 13, 2009

(51) Int. Cl.
*B25B 7/02* (2006.01)
*B25B 1/04* (2006.01)
*B23Q 3/02* (2006.01)

(52) U.S. Cl. .................. 81/426; 269/6; 269/96; 81/420

(58) Field of Classification Search .............. 81/426, 81/426.5, 424.5, 416, 418, 420; 269/282, 269/6, 96, 228, 237, 257, 258; D8/52
See application file for complete search history.

(56) References Cited

U.S. PATENT DOCUMENTS

| | | | | |
|---|---|---|---|---|
| 3,984,092 A | * | 10/1976 | Fitzpatrick | 269/96 |
| 4,673,174 A | * | 6/1987 | Tabbert | 269/258 |
| 4,747,588 A | * | 5/1988 | Dillhoff | 269/6 |
| 5,456,144 A | * | 10/1995 | Dahl et al. | 269/6 |
| 5,873,568 A | * | 2/1999 | Mayfield | 269/6 |
| 6,311,589 B1 | * | 11/2001 | Schmitt | 81/426 |
| 6,367,357 B1 | * | 4/2002 | Thomas | 81/426 |
| 6,698,314 B1 | * | 3/2004 | Nichols | 81/424.5 |
| D495,225 S | * | 8/2004 | Kurtz | D8/52 |

* cited by examiner

*Primary Examiner* — Hadi Shakeri
(74) *Attorney, Agent, or Firm* — Michael R. Philips

(57) ABSTRACT

An offset force clamp is provided for securely holding a workpiece to a table of a cutting machine. The clamp is a modified clamping pliers having a planar base jaw and an elongate upper jaw oriented perpendicular to one another. The base jaw is preferably mounted fixedly to a first handle of the clamp and the upper jaw is preferably mounted pivotably to a second handle of the clamp. The base jaw is configured to engage the table as the upper jaw applies an offset force to hold the workpiece so that the clamp is not cut during the cutting operation.

7 Claims, 4 Drawing Sheets

OFFSET FORCE CLAMP

FIELD OF THE INVENTION

The present invention relates to the field of clamping devices, and more particularly to clamps using a pair of handles for causing a connected pair of jaws to engage a workpiece.

BACKGROUND OF THE INVENTION

A clamp is a tool useful either for holding two parts together during an assembly operation, e.g. gluing, or for holding one or more pieces in place on a table for machining, that is drilling, cutting, etc. A significant advance in the design and utilization of clamps was the creation of the clamping pliers, most popularly known as Vice Grip® pliers. The Vice Grip® pliers has a first handle that is rigidly connected to a first jaw and a second handle that is pivotably connected to a second jaw with an intermediate link that is pressed past a pivot center point to hold the jaws closed against the workpiece. Since the introduction of the Vice Gripe pliers, many variations of jaw configuration have been developed for specific applications. In all known configurations of the clamping pliers or other types of clamps, the two jaws are symmetrical and linearly opposed to one another to apply the clamping force to the workpiece.

In many cutting operations involving machines, e.g. water jet cutters, band saws, milling machines, etc., it is necessary to clamp the workpiece to the machine table during the cutting operation to improve accuracy and safety. Water jet cutters operate at high rates of water flow generated by pressure of 50,000 psi to 60,000 psi, and are able to cleanly cut through steel plates. When the piece being cut is large enough, the clamping point can be remote from the cutting implement and hold the workpiece securely. When the piece being cut is small, clamping is difficult and the clamp may be cut by the water jet along with the workpiece. Attempting to perform a cutting operation without a mechanical clamp can result in personal injury to the machine operator. Therefore, a need exists for a clamp that is able to securely hold a small workpiece during a cutting operation without the clamp being damaged.

SUMMARY OF THE INVENTION

The present invention provides an offset force clamp for holding a workpiece on a table of a cutting machine. The clamp utilizes a pair of non-symmetrical jaws that are actuated by a clamping pliers mechanism. A first jaw is affixed to one handle of the pliers and configured to releasably engage a table of a Cutting machine. A second jaw is pivotably connected to the second handle of the pliers and configured to apply a clamping force at a location remote from the first jaw. The second jaw is relatively long and narrow. The first jaw is placed into engagement with the table in a location remote from the cutting implement, the workpiece is placed on the table in a location for cutting, and the pliers' handles are moved together to cause the second jaw to hold the workpiece against the table. The typical adjusting screw of the clamping pliers is effective to increase or decrease the jaw clamping force.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

Figure 1:
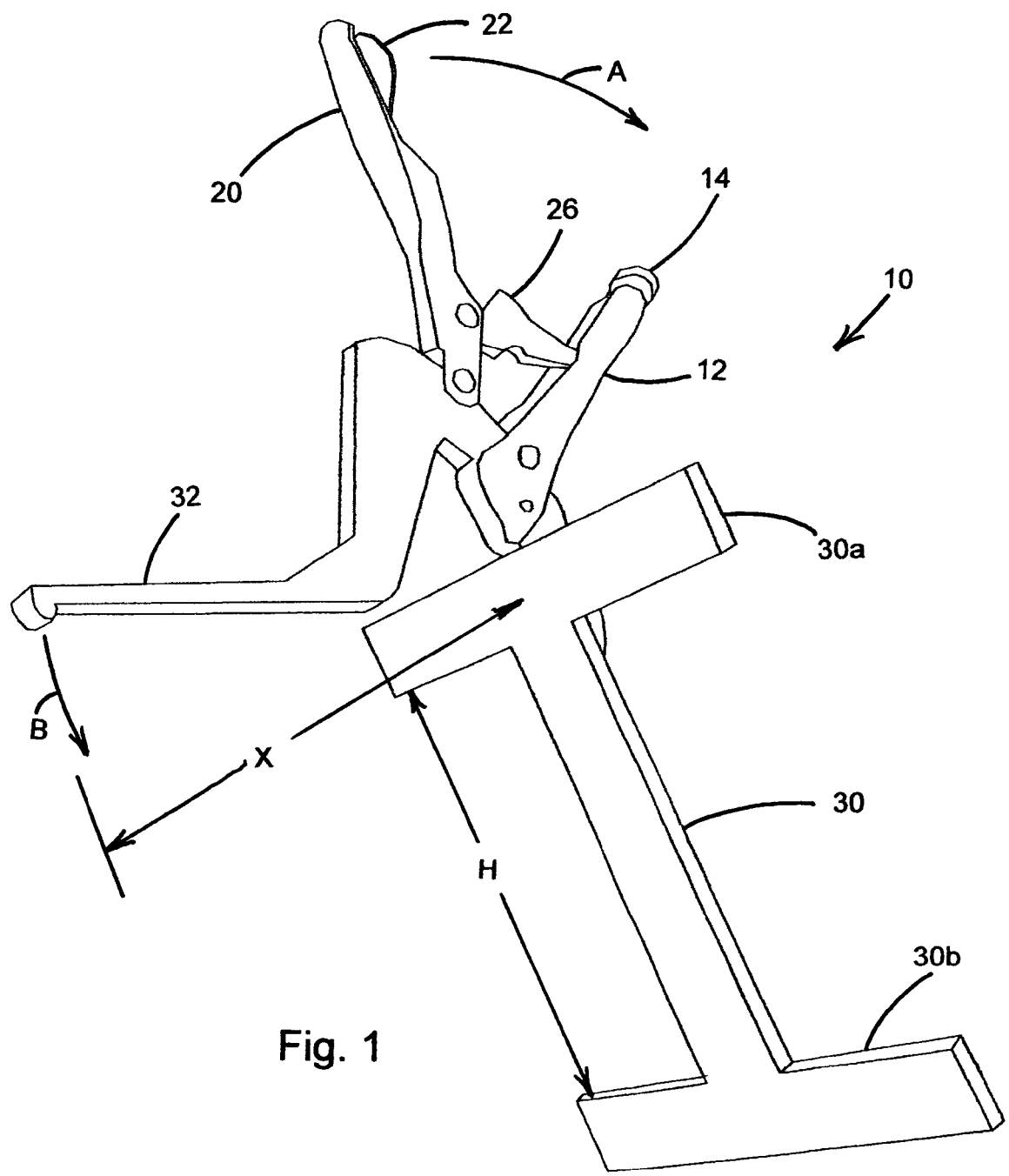
FIG. 1 is a front perspective view of the offset force clamp of the present invention.

Referring to FIG. 1, an offset force clamp 10 of the invention is shown in front perspective view. Clamp 10 has a fixed handle 12 and a pivoted handle 20 that are operable to press an elongate upper jaw 32 against a workpiece as a substantially planar base jaw 30 engages a table, as will be described below. Fixed handle 12 and pivoted handle 20 are oriented in a plane that is substantially perpendicular to the plane of base jaw 30. Upper jaw 32 is oriented in a plane that is substantially parallel to handles 12 and 20 and is perpendicular to the plane of base jaw 30. The operation of clamping a workpiece involves moving pivoted handle 20 in the direction indicated by arrow A toward fixed handle 12. This movement of pivoted handle 20 daises upper jaw 32 to move in the direction indicated by arrow B. A link 26 is pivotably connected to pivoted handle 20 and engages a stop within fixed handle 12 to hold pivoted handle 20 in a locked position and apply a force for holding the jaws together. A release 22 is mounted pivotably to pivoted handle 20 for opening clamp 10 and removing the workpiece.

Referring further to FIG. 1, base jaw 30, according to the preferred embodiment of the invention, is substantially planar and formed in the configuration of the letter "I" with a central column, an upper cross bar 30a, and a lower cross bar 30b. Upper cross bar 30a and lower cross bar 30b are separated by a height H that is sufficient to engage a table, as will be described below. Upper jaw 32 extends a distance X outwardly perpendicular from the plane of base jaw 30 to apply an offset force for holding the workpiece to the table. The dimensions for height H and distance X are determined according to the parameters of the cutting equipment used.

Figure 2:
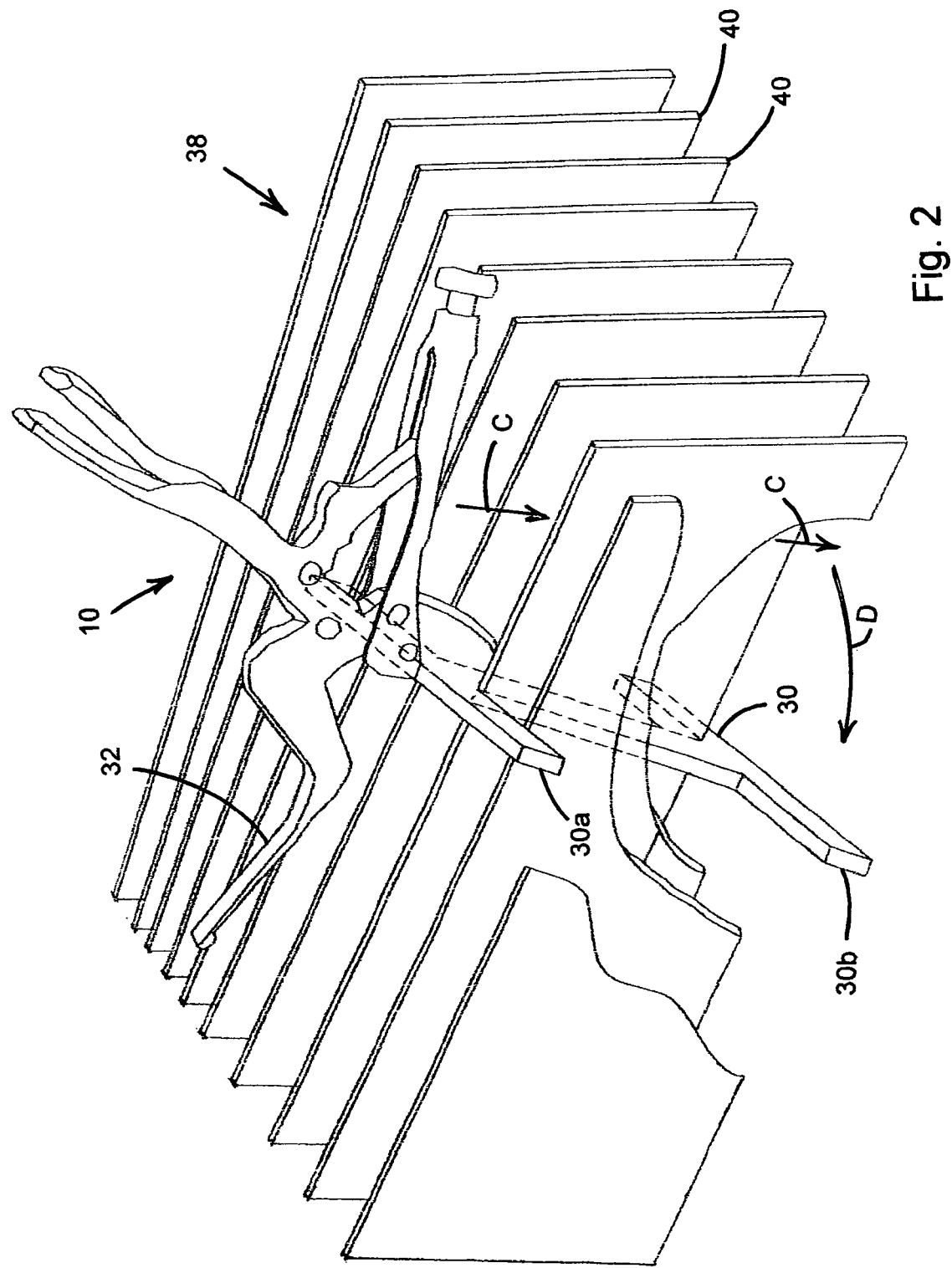
FIG. 2 is a side perspective view of the offset force clamp shown in FIG. 1 with a first jaw engaging a table of a cutting machine, e.g. a water jet cutter.

Referring now to FIG. 2, clamp 10 is illustrated as being engaged with a table of a water jet cutting machine, designated as grate 38 and formed of a plurality of parallel plates 40. It is typical to form the table of a water jet cutting machine as a grate in order to allow the substantial quantity of water discharged by the water jet to drain, although some water may be permitted to accumulate over grate 38. To engage clamp 10 onto grate 38, the machine operator orients lower cross bar 30b of base jaw 30 above and approximately parallel with plates 40, passes lower bar 30b between a pair of adjacent plates 40 in the direction indicated by arrows C, and rotates clamp 10 in the direction indicated by arrow D to orient lower cross bar 30b approximately perpendicular to plates 40. In this position upper cross bar 30a rests on the top surface of plates 40 of grate 38, and lower cross bar 30b is spaced marginally below the bottom surface of plates 40. As illustrated, the weight of the handles of clamp 10 will cause base jaw 30 to rest at an acute angle to vertical after base jaw 30 is inserted through plates 40.

Figure 3:
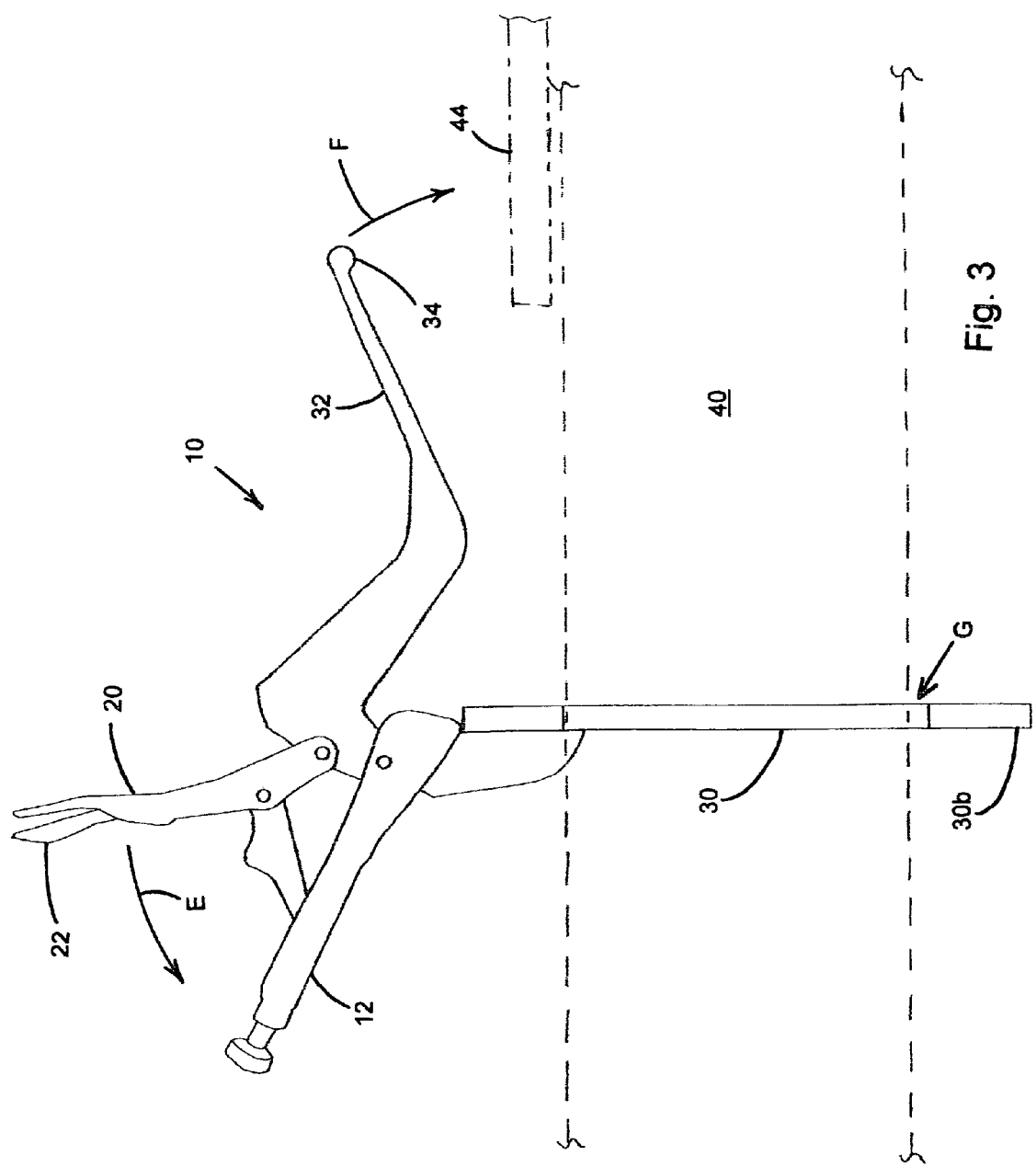
FIG. 3 is a side elevation view of the offset force clamp of FIG. 1 with the first jaw engaging a cutting machine table and the second jaw open, the table and a workpiece shown in dashed lines.

Referring now to FIG. 3, offset force clamp 10 is positioned with base jaw 30 engaging plates 40, shown in dashed lines. A workpiece 44 is positioned on plates 40 for being cut, and is also shown in dashed lines. By forming base jaw 30 with height H (see FIG. 1) that is greater than the height of plates 40, bate jaw 30 can be readily rotated from being oriented parallel to plates 40 to being oriented perpendicular thereto. In the preferred embodiment, a gap G remaining between the bottom surface of plates 40 and lower cross bar 30b is on the order of ⅛ inch to ¼ inch. Elongate upper jaw 32 is positioned with the tip portion 34 thereof above a portion of workpiece 44. According to the preferred embodiment of the invention, clamp 10 is oriented with pivoted handle 20 above fixed handle 12. This preferred orientation of clamp 10 permits pivoted handle 20 to rise when clamp 10 is opened, rather than to go down, therefore avoiding contact with or close proximity to the top surface of plates 40. Closing clamp 10 involves pressing pivoted handle 20 toward fixed handle 12, as indicated by arrow E, causing upper jaw 32 to move in the direction indicated by arrow F toward workpiece 44.

Figure 4:
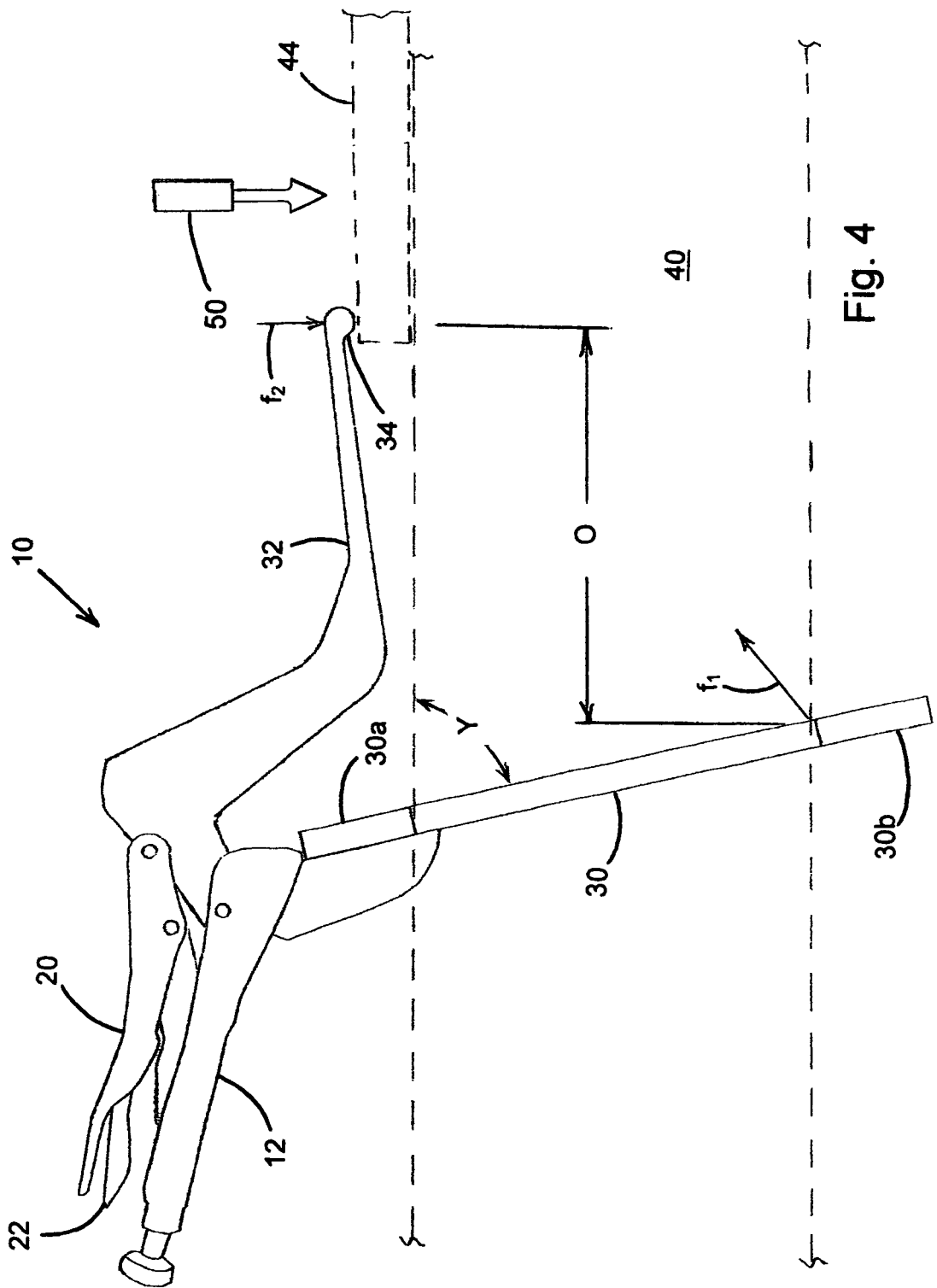
FIG. 4 is a view of the offset force clamp of FIG. 3 with the first jaw engaging a cutting machine table and the second jaw closed to hold the workpiece.

Referring now to FIG. 4, offset force clamp 10 is illustrated in closed and clamped condition with tip 34 of upper jaw 32 holding workpiece 44 against plates 40. As illustrated, tip 34 extends lower than the adjacent body portion of upper jaw 32 to enable tip 34 to securely contact different thickness workpieces. In this clamped condition, upper cross bar 30a is pressed against the top surface of plates 40, lower cross bar 30b is pressed against the bottom surface of plates 40, and base jaw 30 resides at an acute angle Y. The resultant forces applied by clamp 10 are base jaw force $f_1$ and upper jaw force $f_2$. Forces $f_1$ and $f_2$ are offset from one another by a horizontal distance O. With workpiece 44 held securely to plates 40, the nozzle 50 of the water jet cutting machine or another machine cutting implement is actuated to cut the desired pattern in workpiece 44. The offset position of base jaw 30 and the small size of upper jaw 32 avoids either jaw being damaged by the cutting operation. According to the cutting operation being performed, additional offset force clamps may be used to securely hold different areas of the workpiece being cut.

Referring further to FIG. 4, when the cutting operation is complete, release 22 is lifted, allowing pivoted handle 20 and upper jaw 32 to move up and return to the positions shown in FIG. 3. Unless clamp 10 is intentionally removed from plates 40, base jaw 30 remains engaged with plates 40. Offset force clamp 10 is ready for holding an additional workpiece for another cutting operation.

In an alternate use of the offset force clamp 10 of the present invention, base jaw 30 is configured as an inverted "T" to engage a slot that is commonly provided in milling machine tables and the like. A lower cross bar of the inverted "T" is inserted into the "T" slot and clamp 10 is rotated to orient lower cross bar 30b perpendicular thereto and prevent accidental removal. Clamp 10 is then operated as described above to apply an offset force to a workpiece.

While the description above discloses preferred embodiments of the present invention, it is contemplated that numerous variations and modifications of the invention are possible and are considered to be within the scope of the claims that follow.

What is claimed is:

1. An offset force clamp for holding a workpiece to a table formed with a plurality of openings, the clamp comprising:
 a. a fixed handle;
 b. a pivoted handle;
 c. a substantially planar base jaw formed with a central column sized for being passed through one of the plurality of openings in the table, the base jaw having an upper cross bar connected in substantially perpendicular relation to a proximal end of the central column and having a lower cross bar connected in substantially perpendicular relation to a distal end of the central column, the base jaw configured for removably engaging a bottom surface of the table, a proximal end of the base jaw being rigidly mounted to the fixed handle; and
 d. an elongate upper jaw for holding the workpiece, the elongate upper jaw pivotably mounted to the fixed handle and pivotably connected to the pivoted handle;
 e. wherein the elongate upper jaw extends a distance outwardly perpendicular from the plane of the planar base jaw to apply an offset force for holding the workpiece to the table.

2. The offset force clamp described in claim 1, wherein the pivoted handle is connected to the upper jaw distal from the base jaw to enable the pivoted handle to open away from the table.

3. The offset force clamp described in claim 1, wherein the upper cross bar and the lower cross bar are separated by a distance to enable engagement with the table.

4. The offset force clamp described in claim 1, wherein the upper jaw is formed with a tip at a distal end thereof, the tip extending below an adjacent body portion of the upper jaw.

5. The offset force clamp described in claim 1, wherein the upper jaw and the base jaw are non-symmetrical.

6. The offset force clamp described in claim 1, wherein the elongate upper jaw is oriented in a plane that is substantially perpendicular to the plane of the base jaw.

7. The offset force clamp described in claim 1, wherein the elongate upper jaw extends outwardly in perpendicular relation to the plane of the base jaw.

* * * * *